United States Patent
Dennis et al.

(10) Patent No.: US 7,245,424 B2
(45) Date of Patent: *Jul. 17, 2007

(54) AMPLIFICATION DEVICE UTILIZING THULIUM DOPED MODIFIED SILICATE OPTICAL FIBER

(75) Inventors: Michael Dennis, Alexandria, VA (US); Brian Cole, Arlington, VA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 79 days.

This patent is subject to a terminal disclaimer.

(21) Appl. No.: 11/151,176

(22) Filed: Jun. 9, 2005

(65) Prior Publication Data
US 2005/0243407 A1 Nov. 3, 2005

Related U.S. Application Data

(60) Division of application No. 10/261,619, filed on Oct. 2, 2002, now Pat. No. 6,924,928, which is a continuation-in-part of application No. 09/967,942, filed on Oct. 2, 2001, now Pat. No. 6,667,257.

(60) Provisional application No. 60/236,701, filed on Oct. 2, 2000.

(51) Int. Cl.
*H01S 3/00* (2006.01)
*H01S 3/30* (2006.01)
*C03B 37/075* (2006.01)

(52) U.S. Cl. .................... 359/341.41; 65/390; 372/6

(58) Field of Classification Search ............... 65/390; 372/6; 359/341.41, 341.1
See application file for complete search history.

(56) References Cited

U.S. PATENT DOCUMENTS
4,852,117 A * 7/1989 Po ................... 372/97
(Continued)

FOREIGN PATENT DOCUMENTS
JP 5275792 10/1993
(Continued)

OTHER PUBLICATIONS
Cole et al, S-band amplification in a thulium doped silicate fiber, Technical Digest, vol. 54, Optical Fiber Communication Conference 2001, p. TiQ3-ITuQ3-3.
(Continued)

*Primary Examiner*—Deandra M. Hughes
(74) *Attorney, Agent, or Firm*—John J. Karasek; Amy Ressing

(57) ABSTRACT

A device amplifies light at wavelengths in the vicinity of 1420-1530 nm, using thulium doped silica-based optical fiber. This wavelength band is of interest as it falls in the low-loss optical fiber telecommunications window, and is somewhat shorter in wavelength than the currently standard erbium doped silica fiber amplifier. The device thus extends the band of wavelengths which can be supported for long-distance telecommunications. The additional wavelength band allows the data transmission rate to be substantially increased via wavelength division multiplexing (WDM), with minimal modification to the standard equipment currently used for WDM systems. The host glass is directly compatible with standard silica-based telecommunications fiber. The invention also enables modified silicate based amplifiers and lasers on a variety of alternative transitions. Specifically, an S-band thulium doped fiber amplifier (TDFA) using a true silicate fiber host is described.

13 Claims, 12 Drawing Sheets

U.S. PATENT DOCUMENTS

| | | |
|---|---|---|
| 5,406,410 A | 4/1995 | Hanna et al. |
| 5,432,806 A | 7/1995 | Snitzer |
| 5,668,659 A | 9/1997 | Sakamoto et al. |
| 6,407,853 B1 * | 6/2002 | Samson et al. ......... 359/341.31 |
| 6,411,432 B1 * | 6/2002 | Kasamatsu ............. 359/341.33 |
| 6,476,960 B1 * | 11/2002 | Traynor et al. ......... 359/341.31 |
| 6,490,082 B2 * | 12/2002 | Choi et al. ................... 359/343 |
| 6,501,596 B1 * | 12/2002 | Inoue et al. .............. 359/341.5 |
| 6,574,406 B2 * | 6/2003 | Ainslie et al. ............... 385/123 |
| 6,667,257 B2 * | 12/2003 | Cole et al. ..................... 501/37 |
| 6,721,092 B2 * | 4/2004 | Aozasa et al. ............ 359/341.5 |
| 6,914,915 B2 * | 7/2005 | Kasamatsu ...................... 372/6 |
| 2000/0307176 | 11/2000 | Tadashi et al. |
| 2002/0021882 A1 | 2/2002 | Wyatt et al. |
| 2002/0075909 A1 | 6/2002 | Kasamatsu et al. |

FOREIGN PATENT DOCUMENTS

| | | |
|---|---|---|
| JP | 2000307176 | 11/2000 |
| JP | 2001223419 | 8/2001 |

OTHER PUBLICATIONS

Cole et al, Novel heavy metal modified silica glass fibers doped with thulium, holimium, and thulium-sensitive-holmium high quantum efficiencies, Filed on Oct. 2, 2000, Patent Pending.

* cited by examiner

| | |
|---|---|
| Core composition | $(GeO_2)_{24}\ (Al_2O_3)_{2.7}\ (SiO_2)_{73.3}$ + 2% (wt.) $Tm^{3+}$ |
| Core/cladding diameter | 3.5 μm/125 μm |
| Numerical aperture | 0.35 |
| Tm doping profile | Central $1/7$ of core area |
| Lifetime of $^3F_4$ level | 950 μs |
| Lifetime of $^3H_4$ level | 52 μs |
| Fabrication method | Tm chelate/modified chemical vapor deposition |

Fig. 5

AMPLIFICATION DEVICE UTILIZING THULIUM DOPED MODIFIED SILICATE OPTICAL FIBER

CROSS-REFERENCE TO RELATED APPLICATION

This is a divisional application of application Ser. No. 10/261,619 filed on Oct. 2, 2002 now U.S. Pat. No. 6,924, 928, which is a continuation-in-part of U.S. application Ser. No. 09/967,942 filed Oct. 2, 2001, issued as U.S. Pat. No. 6,667,257 on Dec. 23, 2003, which claims the benefit of U.S Provisional Application No. 60/236,701 filed Oct. 2, 2000. The entire contents of application Ser. No. 10/261,619 are incorporated herein by reference.

BACKGROUND OF THE INVENTION

The present application relates, generally, to light amplification and laser devices, and, more particularly, to light amplification and laser devices that utilize a thulium doped modified silicate optical fiber.

The extraordinary advancement of wide area networking services, e.g., the Internet, over the past several years has been enabled by the confluence of two key technologies, i.e., the erbium doped optical fiber amplifier, EDFA, and wavelength division multiplexing, WDM. Since the discovery by Townsend and Payne in the late 1980's of a method for fabricating high quality rare-earth doped silica fibers, much work has centered on the development of and the exploitation of the EDFA. The typical EDFA consists of $Er^{3+}$ doped into an alumino-silicate glass optical fiber. The developments have revolutionized the telecommunications industry as EDFA has replaced electronic repeaters in fiber based networks. The EDFA coupled with the development of WDM technology has allowed for the engineering of high bandwidth optical systems in the region of 1525 to 1570 nm. This is within the "low-loss" or "third" optical fiber telecommunications window. The low-loss window is the range 1420 nm to 1650 nm where the attenuation per unit length for silica optical fiber is near its minimum, e.g., <0.35 dB/km. The C-band 1525 to 1585 nm, and L-band, 1585 to 1650 nm, are each covered by the EDFA, but it is apparent that these two bands represent a portion of the low-loss region for silica but not the total. Due to the fortunate coincidence of the $Er^{3+}$ gain transition with the low-loss window, the EDFA has come to be extensively used in optical fiber telecommunications systems. The EDFA has also enabled the transmission of enormous quantities of data via WDM, that is, by providing gain simultaneously for multiple data transmission channels at different wavelengths within the bandwidth of the EDFA. To date no practical amplifier has been demonstrated for wavelengths of <1520 nm, so that fully half of the low-loss window bandwidth is unused.

There is a desire for the development of the S-band amplifier. This requires that the rare-earth ion with an appropriate transition have fluorescence in the region of approximately 1450 to 1520 nm. $Tm^{3+}$ has the necessary fluorescence. The relevant transition is $^3H_4$ to $^3F_4$, which fluoresces at 1430-1500 nm. In the absence of nonradiative quenching, the lifetime of the upper level, $^3H_4$, is expected to be approximately, 1.5 ms; this is observed for $Tm^{3+}$ in low phonon energy fluorozirconate glasses. However, the energy separation between $^3H_4$ level and the next lower level, $^3H_5$, is sufficiently small, 4400 $cm^{-1}$, that the upper level is substantially quenched by multiphonon processes in high-phonon energy glasses like the silicates. The lifetime has been measured as <20 μs in a pure silica host. Depletion of the upper state lifetime via nonradiative processes reduces the population available to provide gain on the transition of interest. While fiber amplifiers based on this transition have been demonstrated in fluorozirconate glasses, these have proved impractical due to various problems with the host material.

Thulium, Tm, has a $^3H_4$ to $^3F_4$ transition which provided amplification in the S-band wavelength range using a fluorozirconate host. This fluorozirconate material possesses properties that do not lend the material for use in lasers or in optical fibers. These materials are hygroscopic, prone to formation of micro-crystallites over time and have glass transition temperatures at about 400° C. which prevents fusion splicing to standard telecommunications-grade fibers. In the event these glasses are butt spliced they tend to become damaged with heavy pumping.

Although the fluoride and tellurite hosts doped with thulium offer high quantum efficiencies for the 1.47 μm transition, some of the material's properties are problematic with respect to making a practical device. Fluoride glasses are very difficult to fabricate into low-loss fiber due to a propensity towards crystallization and suffer from poor chemical durability. Tellurite glasses, although stable, have a high index of refraction and high thermal expansion, which complicates splicing into an all-optical system.

With the advent of new silica fibers with low-loss across the entire region of 1200 to 1600 nm, i.e., <0.35 dB/km, optical amplifiers that can potentially amplify at other wavelengths within this region are of increased importance.

Silica host materials do have both good chemical and mechanical properties, e.g., fusion splicing to the silicates, high mechanical strength, high glass transition temperature, and extremely low thermal expansion. However, doping silica materials with $Tm^{3+}$ has low fluorescence and high phonon quenching and therefore is not practical for use in optical fiber systems.

However, a silica glass material doped with $Tm^{3+}$, $Ho^{3+}$, and $Tm^{3+}$-sensitized-$Ho^{3+}$ in which the material has reduction in the multiphonon quenching compared to the multiphonon quenching of pure silicates has recently been proposed. This material overcomes some of the difficulties with utilizing thulium discussed above. It would therefore be desirable to provide a device that amplifies light at wavelengths in the vicinity of 1420-1530 nm, using such a thulium doped silica-based optical fiber.

SUMMARY OF THE INVENTION

A device amplifies light at wavelengths in the vicinity of 1420-1530 nm, using a thulium doped silica-based optical fiber. This wavelength band is of interest as it falls in the low-loss optical fiber telecommunications window, and is somewhat shorter in wavelength than the currently standard erbium doped silica fiber amplifier. The device thus extends the band of wavelengths that can be supported for long-distance telecommunications. The additional wavelength band allows the data transmission rate to be substantially increased via wavelength division multiplexing (WDM), with minimal modification to the standard equipment currently used for WDM systems. The host glass is directly compatible with standard silica-based telecommunications fiber. The host glass also enables modified silicate based amplifiers and lasers on a variety of alternative transitions. Specifically, an S-band thulium doped fiber amplifier (TDFA) using a true silicate fiber host is provided.

Specifically, the present invention utilizes a modified silica glass providing a reduction in the multiphonon quenching for a rare-earth dopant that contains: $SiO_2$ in a host material; a rare-earth oxide dopant selected from the group consisting of $Tm^{3+}$, $Ho^{3+}$ and $Tm^{3+}$ sensitized —$Ho^{3+}$; a first $SiO_2$ modifier; in which the first modifier is a 3+ cation dopant, and the first modifier is selected from the group consisting of Ga, Y and combinations thereof such that the first modifier reduces multiphonon quenching of the rare-earth dopant contained therein. Still further, a second $SiO_2$ modifier is preferably utilized, w wherein the second modifier concentration is between about 0.1 and about 10 molar percent of the second modifier in the host material such that the first modifier and the second modifier reduce multiphonon quenching of said rare-earth dopant contained therein.

The preferred fiber composition is preferably made by combining: between about 70 and about 99 molar percent $SiO_2$ in a host material; between about 100 and about 100,000 ppm by weight of a rare-earth oxide dopant selected from the group consisting of Thulium, Holmium and Thulium-sensitized-Holmium; between about 0.1 and about 20 molar percent of a first modifier; and between about 0.1 and about 10 molar percent of a second modifier; such that the first and second modifiers reduce multiphonon quenching of the rare-earth contained therein.

The above-described thulium doped silica based optical fiber is utilized in combination with a mechanism for introducing a pump light into the fiber, and a mechanism for providing an output from the fiber, in amplification and laser devices, wherein the devices operate on the $^3H_4 \rightarrow {^3F_4}$ transition.

Other advantages and features of the invention will become apparent to those skilled in the art from the following detailed description of the preferred embodiments of the invention when taken with the accompanying drawings.

BRIEF DESCRIPTION OF THE DRAWINGS

A more complete appreciation of the invention will be readily obtained by reference to the following Description of the Preferred Embodiments and accompanying drawings in which like numerals in different figures represent the same structures or elements, wherein:

FIG. 5 is a table listing physical properties of an experimental thulium doped fiber in accordance with the invention;

DESCRIPTION OF THE PREFERRED EMBODIMENTS

Prior to discussing the specifics of an amplifier and laser device structure in accordance with the invention, a description of a modified silica glass utilized in the device structures will be provided. The modified silica glass is doped with rare-earth dopant described in co-pending and commonly assigned U.S. patent application Ser. No. 09/967,942 entitled "Novel Heavy Metal Modified Silica Glass Fibers Doped With Thulium, Holmium, and Thulium-Sensitized-Holmium High Quantum Efficiencies" filed on Oct. 2, 2001 and published as United States Patent Application Publication US 2002/0064366 A1 on May 30, 2002. The relevant portions of the above-referenced published patent application have been incorporated into the present application.

Glass has no long-range order so that is atomic arrangement is characterized by an extended three-dimensional structure which lack symmetry and periodicity, W. H. Zachariasen, J. Am. Chem Soc., 54 (1932), 3841. There is a short range order mainly attributed to local order around structural elements. Most of the elements are covalently bonded with strong directional bonds, i.e., a tetrahedron. Structural modifying elements which adjust the connectivity and the dimensionally of the structural have weak, ionic and non-directional bonds. Their coordination environments are traditionally considered to be more distorted and variable than in crystals, and their spatial distributions are regarded as random or homogeneous. This view of the structure of glass is known as the "continuous-random-network", CNR, theory.

Some have challenged the CNR theory with a new theory, modified-random-network, MRN. The MRN theory states that the immediate environment of the glass-modifying cation is found to be rather more well-defined than would be predicted by the conventional CRN. The glass modifiers are found not to be spread uniformly throughout the glass, but rather to adopt a non-random and inhomogeneous distribution in glass leading to "pools" with modifier-rich regions or separate glass-former-rich regions. See, Wang, J., Journal of Non-Crystalline Solids, 163, pp. 26-267, 1993.

Figure 1:
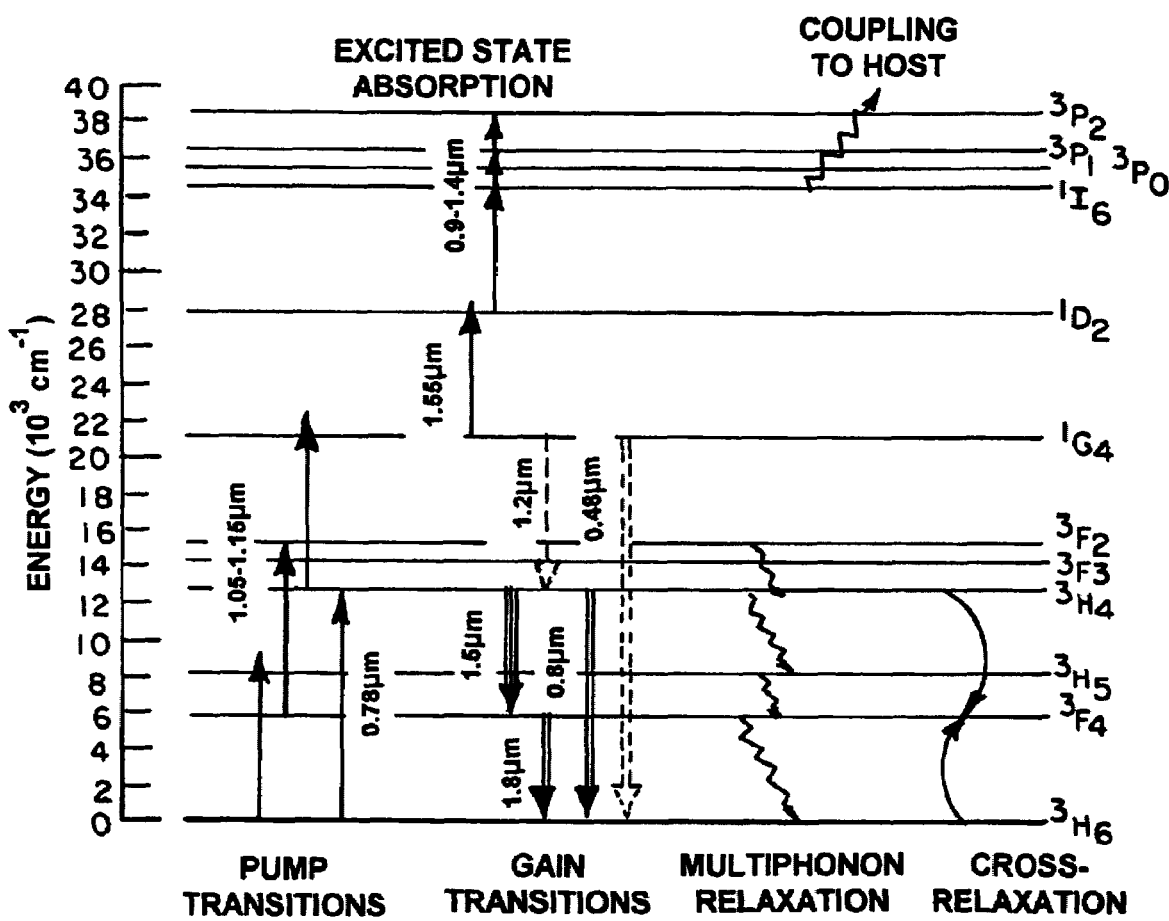
FIG. 1 illustrates the energy level diagram for $Tm^{3+}$.

FIG. 1 illustrates the energy level diagram for thulium with the fluorescence for the $^3H_4$-$^3F_4$ transition. The upper $^3H_4$ level has a closely lying lower $^3H_5$ level that results in significant multiphonon quenching when doped into a host with high phonon energy. The multiphonon relaxation is a process where the excited rare earth ion has a coupling to the phonon, lattice vibrations, of the host material. This process results in a decrease in fluorescence efficiency. In general, a reduction of the highest energy phonon for the glass matrix will result in increased fluorescence efficiencies for rare earth ions.

Using solution chemistry as a model, the $SiO_2$ network is poor a solvent for rare earth ions. 3+ cation dopants and/or 5+ cation dopants and/or 4+ cation dopants solubilize the rare earth dopant, e.g., $Tm^{3+}$, in the silica. Both the 3+, 4+, and 5+ cations are modifiers in the silica glass and therefore become part of the iso-structure of the network, i.e., they are incorporated into the local bonding configuration of the tetrahedral. When $Tm^{3+}$ is added to the structure the 3+ and/or 4+ and/or 5+ cation dopants solubilize the $Tm^{3+}$, i.e., a large fraction of the $Tm^{3+}$ or other rare-earth dopants are in an environment where dopants are not influenced by the high-energy vibrations of the silica glass. Thus, the vibration energy associated with the modifiers-silica bond is significantly lower than that of the host glass, so that the nonradiative decay from the Tm3+ or other rare-earth ion, i.e., Holmium, and Thulium-sensitized-Holmium, is reduced. This solubilizing lowers the multiphonon quenching of the Tm3+ so that the photons radiate from the $^3H_4$ to $^3F_5$ without the loss of many phonon relaxing from the $^3H_4$ to the $^3H_5$ level. The photons for Tm-2 µm, specifically 1.8 to 2.0 µm, radiate from $^3F_4$ to $^3H_6$, for Holmium-2 µm energy transfer is from $^5I_7$ to $^5I_8$, and for Thulium-sensitized-Holmium-pumped Thulium energy transfer from Tm $^3F_4$ level to Ho $^5I_7$, Holmium emission $^5I_7$ to $^5I_8$ at about 2 µm.

$Tm_2O_3$ is a rare earth element that radiates in the S-band, 1420-1525 nm. A concentration of from about 100 ppm to about 100,000 ppm by weight of the oxide is added to the silica glass. Holmium and Thulium-sensitized-Holmium are also dopants that are possible in the silica glass. A concentration of from about 100 ppm to about 100,00 ppm by weight of the oxide is added to the silica glass.

There is at least one cation that is desired as modifiers of the silica glass structure. The first modifier is a 3+ cation having a concentration of from about 0.1 to about 20 molar %. Examples of the first modifier are Ga, Y and combinations of the two. A second modifier is a 5+ cation having a concentration of from about 0 to about 10 molar percent and can also be added. Examples of the second modifier are Ta, Bi and combinations thereof. The preferred embodiment will contain a first and a second modifier. When the second modifier is present, the concentration is between about 0.1 to about 10 molar percent.

It is realized that simple permutations can take place. For example, 4+ cations such as Ge and Sn can be substituted into the structure for the Si ion. The motivation for this substitution may be to increase the photosensitivity for the core glass. As these 4+ cations are of heavier mass compared to the Si so that they have the additional beneficial property of further reducing the overall phonon energy for the host material.

Although, not wanting to be held to a specific theory for purposes of this disclosure, it is thought that the first modifier, e.g., Ga, will solubilize the rare-earth resulting in improved radiative efficiency for the rare-earth. The theory of solubilization is similar to the use of a surfactant for solubilizing oil in water. The rare-earth is soluble in the modifier rich regions and the modifiers are soluble in the silica.

$SiO_2$ is found in the glass and has a concentration of from about 70 to about 99 molar percent. To determine the concentration, one, typically, has to make up a bulk standard of a similar composition to the fiber optic that is desired. Then, the absorption is measured as a function of the length in this standard with a known concentration of a rare-earth. Then one makes the fiber optic containing an unknown quantity of the rare-earth. One then measures the absorption of the rare-earth as a function of the length in the fiber optic and then uses the standard to back-calculate the concentration. For host glass there are an array of characterization techniques to identify the composition. The simplest way to determine the composition of the glass is X-ray analysis. Thus, to determine the concentration of the silica and the first, second and third modifiers is by using X-ray analysis.

The cross-section of the center of the glass core has a core diameter and the rare-earth ions are substantially contained within a volume of glass core having a cross section whose diameter is equal to or less than that of the core diameter. The optical fiber, laser and ASE source can contain a single mode core composition of the modified rare-earth doped silica glass composition of the present invention. There can also be a multimode core that surrounds the glass core and one or more claddings that surround the multimode core. The multimode core has a non-circular cross-section. The laser, the optical fiber amplifier and the ASE device can have the diode radiation side-pumped into the optical fiber.

The glasses and fibers are typically made by a modified CVD (MCVD) technique. This technique is analogous to the organo-metallic CVD technique known in the semiconductor industry, Erbium-Doped Fiber Amplifiers: Fundamentals and Technology, Becker, P. C., et al., 1999, and Rare-Earth-Doped Lasers and Amplifiers, Digonnet, M. J. F. Since this is a non-equilibrium process, glasses made by this technique will not necessarily have the same stoichiometry as the starting components. Typically, compositions are determined spectroscopically or by measuring some property of the glass (e.g., index of refraction) that varies predictably with composition.

The following is given as a specific example, but is not intended to limit the scope of the invention described in this application.

EXAMPLE 1

A gallium doped silica preform doped with thulium was fabricated using MCVD. An all vapor process was used where gallium chloride and rare-earth chelate were transported to the MCVD reaction zone via a heated injection assembly. The MCVD/chelate injection tube assembly used is similar to that outlined in the article by Tumminelli, R. P. et al., "Fabrication of high concentration rare-earth doped optical fibers using chelates", *J. Lightwave Tech.*, vol 8, no. 11, 1990, p. 1680.

The following flow conditions were used: $SiCl_4$: (bubbler T=25° C.) 20 sccm (standard cubic centimeter per minute); $GaCl_3$ (bubbler T=180° C.) 200 sccm; $Tm(TMHD)_3$ (bubbler T=170° C.) 30 sccm; $O_2$: 800 sccm; and He: 800 sccm.

Five grams of $GaCl_3$ was loaded into a quartz bubbler and heated to 180° C. About 10 g of Tm chelate was dispersed in $SiO_2$ sand, loaded into a quartz bubbler, and heated to 170° C. These were connected to the heated injection tube assembly. A 16 mm×20 mm substrate tube was used for the MCVD process.

The gallosilicate core was deposited in the following manner. The 20 sccm of $SiCl_4$ was sent to the MCVD reaction zone. The $GaCl_3$ (T=180° C.) was then sent to the reaction zone. When a stable reaction zone was established, the Tm chelate then introduced to the MCVD reaction zone. A relatively small flow rate for the Tm was used to dope a low concentration of rare-earth into the glass. This was to minimize any ion-ion interactions that could complicate subsequent spectroscopy.

Two passes were deposited under these initial conditions. For the third core deposition pass, the temperature for the GaCl$_3$ bubbler was increased to 210° C. After three core pass depositions, the tube was collapsed into a preform by standard MCVD techniques.

Figure 2:
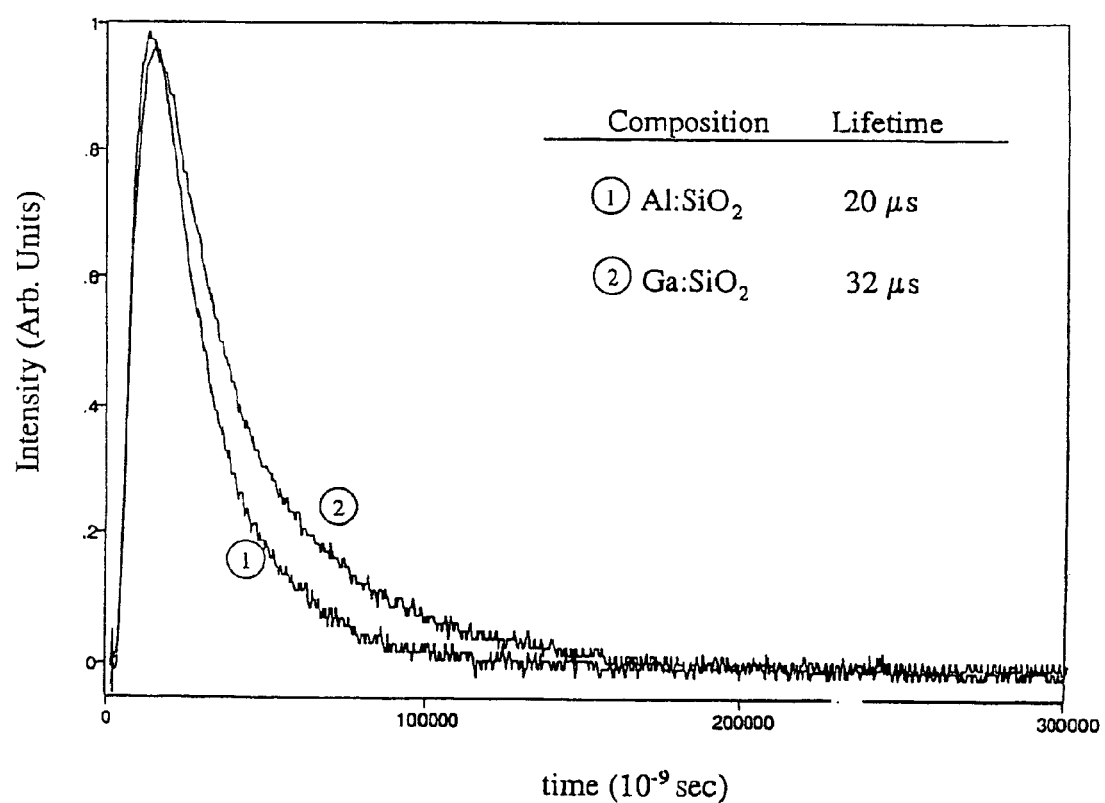
FIG. 2 illustrates the fluorescence decay for $^3H_4$ for $Tm^{3+}$.

The index difference due to gallium was measured to be 0.005 corresponding to an NA~0.10. The $^3H_4$ lifetime for Tm$^{3+}$ in this preform measured 32.3 μs. (For comparison purposes, the lifetime for Tm—Al—SiO$_2$ is 20 μs.) FIG. 2 illustrates the decay for Thulium in the Gallo-silicate host compared to the alumino-silicate host. These samples were excited using a pulsed ti-sapphire laser operating around 770 nm. The fluorescence was passed through a monochromator to separate the pump from the decay. The decay for $^3H_4$ was measured around 800 nm. There is a measurable improvement in the lifetime for the Tm:Gallo-silicate host compared to the alumino-silicate. This is evidence of the heavier massed Gallium solubilizing the rare-earth ion resulting in a decrease in the multiphonon relaxation rate.

The following sections describe a reduction-to-practice demonstration of the subject invention, discuss principal considerations for devising and optimizing practical pumping schemes, and present proposed and demonstrated schemes.

Figure 3:
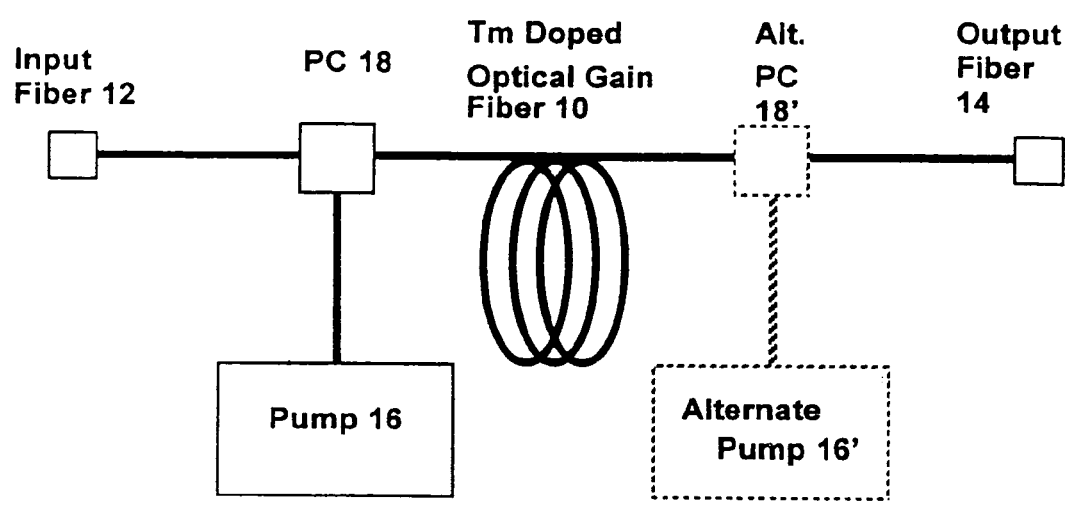
FIG. 3 illustrates a preferred embodiment of an optical amplifier based on thulium doped modified silicate optical fiber.

FIG. 3 illustrates a preferred embodiment of the optical amplifier in accordance with the invention. The amplifier consist of a length of thulium (Tm$^{3+}$) doped gain fiber 10, an optical fiber input 12, an optical fiber output 14, a pump source 16, and a means introducing the pump light into the optical fiber referred to here as a pump combiner (PC) 18. The doped gain fiber 10 is preferably based on the highly modified silicate glass described above, which is engineered to minimize the effective phonon energy, at least in the vicinity of the Tm$^{3+}$ dopant ions. The input and output optical fibers 12, 14 are spliced to the gain fiber 10, and/or the PC 18, preferably by standard fusion splicing techniques. The PC 18 may be of any appropriate design; typical pump combiners for erbium fiber amplifiers are based either on a fused-tapered coupler design or on pigtailed dichroic beam splitters. The pump source may be of any appropriate wavelength, which wavelengths are taught later in this disclosure.

Figure 4:
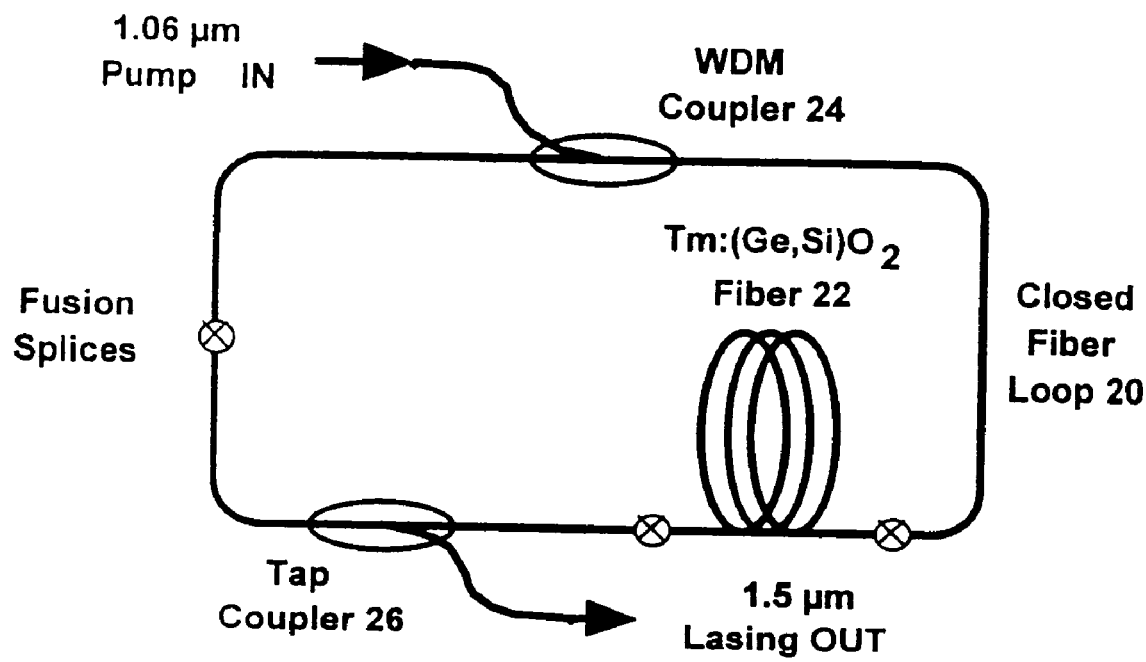
FIG. 4 illustrates the implementation of the amplifier illustrated in FIG. 3 into a ring laser.

FIG. 4 illustrates an exemplary implementation of a fiber laser in accordance with the present invention. The laser cavity consists of a closed fiber loop 20, including a length of Tm$^{3+}$ germano-silicate single mode optical fiber 22 as the gain medium. The fiber 22 has the characteristics listed in table illustrated in FIG. 5. A fused-tapered fiber wavelength division multiplexing coupler (WDM) 24 is provided for coupling a pump wavelength (1064 nm) into the loop 20 (i.e., it serves as the "PC" in FIG. 3.) A second fused-tap coupler 26 is included to tap a small fraction (1-2%) of the signal wavelength (~1500 nm) out of the loop 20. The pump light is sourced from a flash lamp pumped Nd:YAG laser (not shown) at powers up to 10 W, which is coupled into the WDM 24 with an appropriate lens. Thus, the amplifier of FIG. 3 is converted into a ring laser simply by connecting the output to the input.

Figure 6:
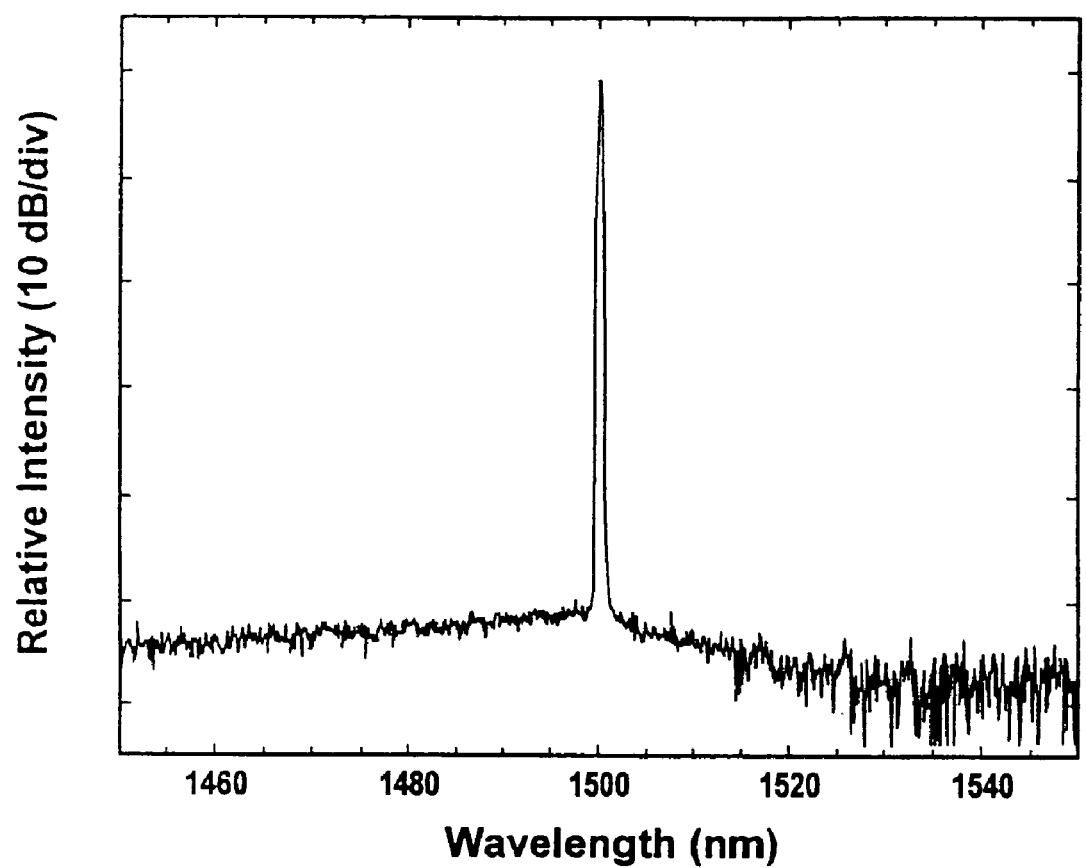
FIG. 6 is a graph illustrating a spectrum of lasing at 1500 nm on the $^3H_4 \rightarrow {^3F_4}$ transition using the configuration illustrated in FIG. 5.
Figure 7:
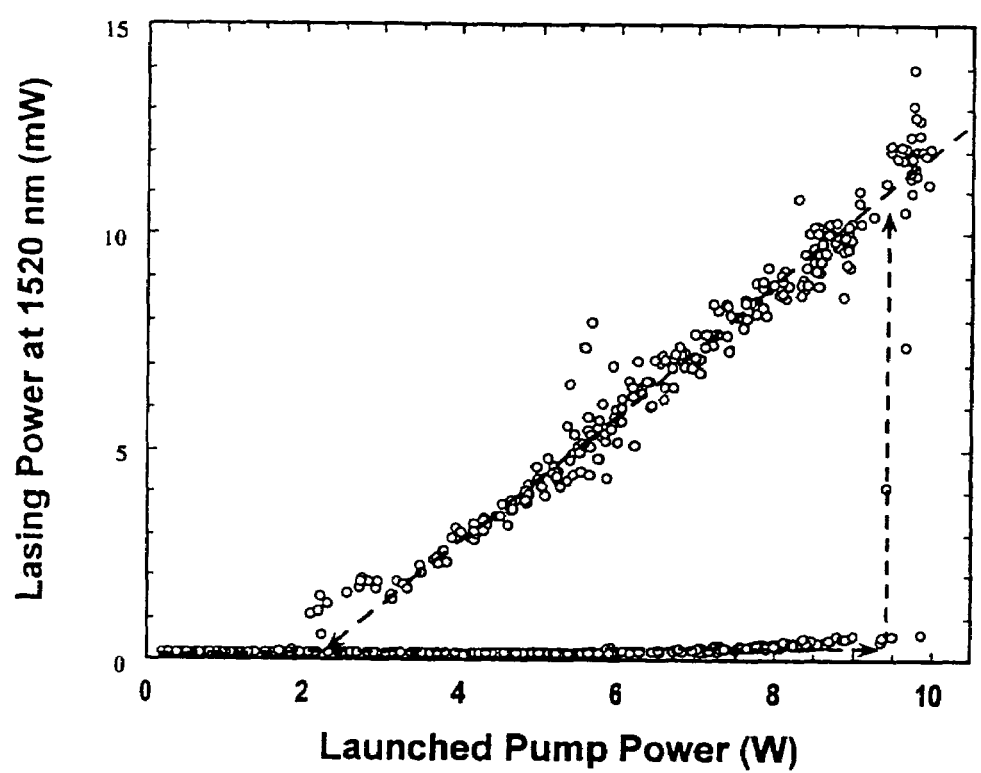
FIG. 7 is a graph illustrating the output power under lasing on the $^3H_4 \rightarrow {^3F_4}$ transition using the configuration illustrated in FIG. 5.

FIG. 6 illustrates a lasing operation on the desired transition, at a signal wavelength of 1500.0 nm. Lasing has been observed at wavelengths in the range 1500-1525 nm using this and similar cavity configurations. FIG. 7 illustrates the output power as a function of the pump power for this configuration. In this embodiment, the lasing threshold was observed to be hysteretic. The total output power of 12 mW and slope efficiency of 0.15% are limited by the non-optimum host material and pumping scheme. Means of improving both of these are described below. It is noted that the measured output power does not accurately reflect the actual conversion efficiency of the pump radiation to the signal radiation. In particular, the laser (and thus the output coupler) is bi-directional, the WDM leaks ~1% of the signal in both directions, and the loss at the fusion splices is likely >2% each (and likely as great as 10%). Also, the abscissa in FIG. 7 indicates the output power of the pump laser; the power coupled into the gain fiber is approximately 70% of this value. Taken together, these considerations indicate a conversion efficiency of ~1-2%.

The following describes the primary physical considerations for devising a pumping scheme for the desired amplifier and laser.

Fast promotion of population to the $^3H_4$ level. This can be via ground state absorption (GSA) to higher levels (e.g., $^3F_2$, $^3F_3$) or to the $^3H_4$ manifold. Alternatively, excited state absorption (ESA) to any of these levels from the $^3F_4$ level may be used, where $^3F_4$ is populated by GSA to either the $^3H_5$ level or directly, or by cross-relaxation with an excited Tm$^{3+}$ (already in the $^3H_4$ state.)

Fast depletion of the $^3F_4$ level. This increases the inversion on the transition of interest, with the salutary effect of improving the efficiency and noise figue of the amplifier. This is particularly important because the radiative lifetime of the $^3F_4$ level is longer than for the $^3H_4$. (Transitions between such levels are traditionally referred to as "self-terminating", as they cannot normally provide continuous gain in the absence of a lower-level depletion process.) Depletion may be accomplished by ESA to the $^3F_2$ or $^3F_3$ levels, or to the upper portion of the $^3H_4$ manifold. Alternatively, it may be accomplished via lasing on the $^3F_4 \rightarrow {}^3H_6$ transition, at wavelengths in the band ~1700-2000 nm; this process is referred to as "cascade lasing". See R. M. Percival et al., "Highly efficient CS cascade operation of 1.47 and 1.82 μm transitions in Tm-doped fluoride fibre laser", *Electron. Lett.* 28, 1866-1868 (1992); and R. Allen et al., "An efficient 1.46 μM thulium fiber laser via a cascade process", *J. Quantum Electron.* 29, 303-306 (1993). The option of Tb codoping to deplete the lower level via a cross-relaxation process has also been investigated in fluorozirconate hosts, though without success. See E. W. J. L. Oomen, "A material and device study for obtaining a blue upconversion fiber laser", *Philips J. Res.* 46, 157-198 (1992).

Excited state absorption from the $^3H_4$ level. This is to be avoided, as it depletes the upper state and so degrades the operation of the desired amplifier. The $^3H_4 \rightarrow {}^1G_4$ transition at ~1120-1200 nm is especially strong, arguing against using wavelengths in this band for pumping the desired amplifier. Significant absorption has been observed on this transition even for wavelengths of <1047 nm.

Gain, lasing, and amplified spontaneous emission on the $^3H_4 \rightarrow {}^3H_6$ transition. Gain and lasing on this near-infrared (~800 nm) transition has been previously demonstrated in fluorozirconate hosts, and in the present inventor's experiments with Tm:silicate fibers. It competes directly with the desired transition, and in fact has an ~11 times higher branching ratio. Possible options for mitigating this competition include: a) pumping at wavelengths with only weak GSA, but with strong ESA from the $^3F_4$ level, which would make it possible to maintain inversion (and thus gain) on the $^3H_4 \rightarrow {}^3F_4$ transition, but with no inversion (and thus loss) on $^3H_4 \rightarrow {}^3H_6$; b) structuring the radial profile for Tm doping for strong overlap with the mode at 1500 nm, but with only weak overlap at 800 nm, which would reduce the relative gain of the latter with respect to the former, and so reduce parasitic ASE in the near-infrared; and c) filter out the 800 nm light along the length of the fiber to prevent ASE buildup, e.g., by using long period fiber gratings.

Excited state absorption of the signal. The desired gain transition overlaps the $^1G_4 \rightarrow ^1D_2$ ESA transition, which is centered at ~1420-1450 nm. This parasitic effect directly reduces the gain on the signal transition; it has been observed in applicants experiments as a significant brightening of the violet (450 nm) $^1D_2 \rightarrow ^3F_4$ fluorescence under 1064 nm pumped lasing at ~1500 nm, with a concomitant extinction of the blue (480 nm) $^1G_4 \rightarrow ^3H_6$ fluorescence. The effect can be avoided by using only pump wavelengths which do not excite the $^1G_4$ level, e.g., by avoiding the 1000-1300 nm band.

The specifics of exemplary pumping methods will now be described in greater detail for use in the present application.

Two-step absorption—This Mechanism was utilized by the applicants in a reduction-to-practice demonstration. A 1064 nm pump is weakly absorbed on the $^3H_6 \rightarrow ^3H_5$ transition, and more strongly absorbed on the $^3F_4 \rightarrow ^3F_2$ transition. (This yields the desired inversion by both depleting the lower level and simultaneously populating the upper level.) Following are some examples of potentially useful two-step absorptions schemes:

i. 785 nm (step 1)+1440 nm (step 2): The initial pump step promotes the population to the upper state; the second step recycles population which has relaxed to the lower level (via radiative or nonradiative processes) back to the upper level. This scheme has the particular advantages of having minimal parasitic excited state absorption of the first step wavelength, and slight ESA of the second step wavelength (as very little population is promoted to the $^1G_4$ level.) In order to avoid parasitic gain and ASE on the $^3H_4 \rightarrow ^3H_6$ transition, it would be important to implement one of the techniques described above. Weak first-step pumping could be usefully implemented by cladding pumping near 785 nm, or core pumping in the wing of this transition (e.g., at wavelengths >800 nm, or <770 nm.) By contrast, the second step should be as strong as possible (core pumping, e.g., at high power), and should be at a wavelength near or just to the blue of the absorption peak (i.e., ~1430-1465 nm.) Note that high power cascaded-Raman fiber lasers, developed for high power and remote pumping of Er amplifiers, are available near this band, and could be readily modified for this application. Note also that the first step could alternatively be pumped on the $^3H_6 \rightarrow ^3F_2$ or $^3H_6 \rightarrow ^3F_3$ transitions, near ~635 nm and ~690 nm, respectively. These are considered less advantageous, however, due to ESA on the $^3H_4 \rightarrow ^1D_2$ and $^3F_4 \rightarrow ^1G_4$ transitions.

ii. ~1000-1300 nm: Single or dual wavelength pumping in this band can effect inversion on the desired transition, so long as careful consideration is given to the processes described above. The particular disadvantages. of choosing this scheme are the parasitic ESA from the upper state, and the weak absorption from the lower state on most of the useful transitions. One option worth consideration would be to pump on the $^3F_4 \rightarrow ^3F_2$ transition in particular, at a wavelength of ~1000 nm or even shorter (to minimize parasitic ESA), perhaps in combination with weak pumping of the $^3H_5$ level directly.

iii. ~1625 nm+1440 nm:. This is essentially similar to (i) above, except that the first step is to the lower gain level (this fact implies that the second step pumping should be accordingly stronger.) An advantage is that the first step wavelength would not suffer any parasitic ESA, and that the strength of the first step absorption can be varied by tuning the wavelength (thus the $^3H_4 \rightarrow ^3H_6$ population difference can be controlled.) Note that moderate power Er fiber lasers are available near the wavelength of interest for the first-step pump.

Ground state absorption with cascade lasing—This would ideally be pumped on the $^3H_6 \rightarrow ^3H_4$ transition (~785 nm.) Lasing at wavelengths in the range 1700-1950 nm on the $^3F_4 \rightarrow ^3H_6$ transition can be effected by placing the gain section inside a high-Q cavity (for that wavelength) formed, e.g., by fiber Bragg gratings, bulk optic mirrors, or with couplers. The lasing in this band would serve to deplete the lower ($^3F_4$) level. (Note: applicants have observed colasing on the 1.8 µm and 1.5 µm transitions. That colasing enhances the inversion on the $^3H_4 \rightarrow ^3F_4$ transition is demonstrated by the observation that the lasing wavelength shifts to the blue by 10-20 nm when 1.8 µm colasing obtains.)

Avalanche upconversion pumping—Avalanche upconversion is a unique pumping process mediated by an ion-ion cross relaxation process. Pumping is performed exclusively on an excited state absorption transition, e.g., at ~1440 nm ($^3F_4 \rightarrow ^3H_4$). (The $^3F_4 \rightarrow ^3F_2$ and $^3F_4 \rightarrow ^3F_3$ transitions are possible as well, although determining the precise pumping mechanism in these cases is confounded by weak ground state absorption.) The excitation process is as follows: a) an initial "seed" ion is promoted to the $^3H_4$ state; b) this ion "cross-relaxes" with an unexcited neighbor ion, so that both ions end up in the $^3F_4$ state; c) both ions absorb pump photons, promoting them to the $^3H_4$ state; d) the excited ions cross-relax with neighboring unexcited ions; and e) step b-d repeat until an inversion is built up. Two conditions are required for this process: 1) strong pumping on an ESA transition, to recycle population back to the upper level; and 2) a high doping concentration, so that the nearest-neighbor distance is sufficiently small to allow efficient (or rather, fast) ion-ion cross-relaxation. (Note that the local concentration must be high, although the average concentration need not necessarily be.)

A variety of alternative pumping schemes are also possible. The following describes alternative gain and lasing transitions in accordance with the present invention.

Figure 8:
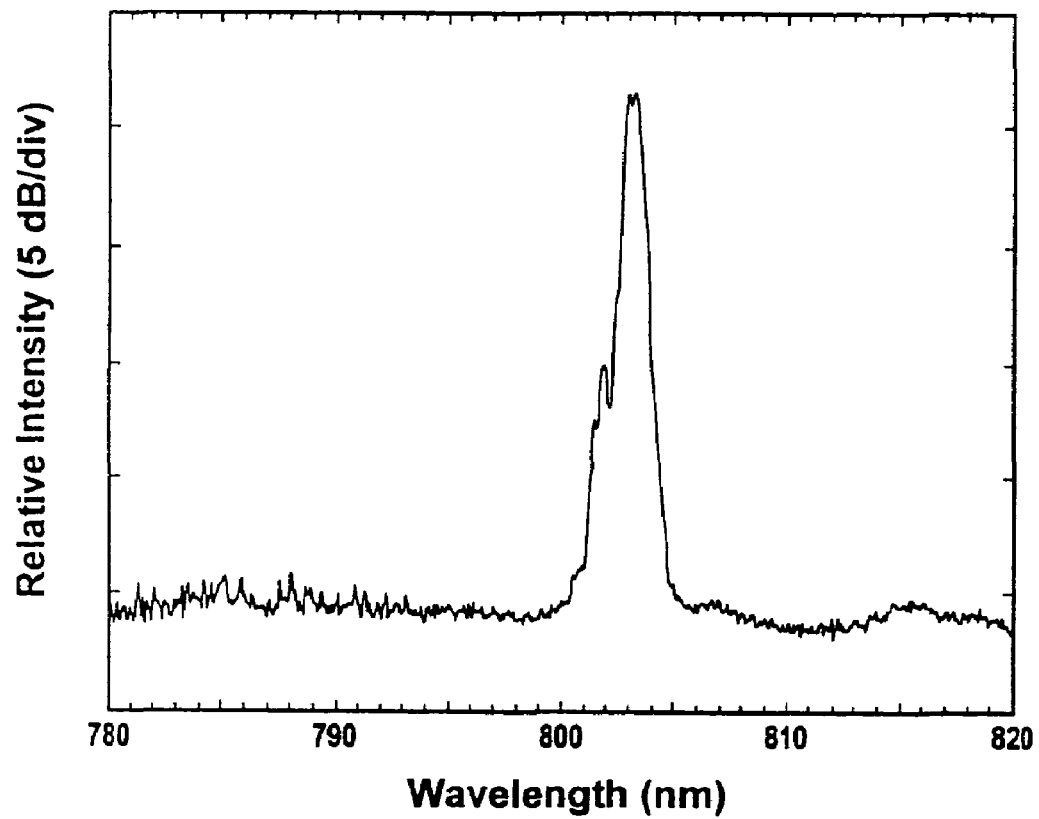
FIG. 8 is a graph illustrating a spectrum of lasing at 800 nm on the $^3H_4 \rightarrow {^3F_4}$ transition using the configuration of FIG. 5.

Gain and lasing at ~800 nm on the $^3H_4 \rightarrow ^3H_6$ transition. This wavelength is of interest for a variety of potential applications. It is in the "first" (so-called for historical reasons) telecommunications window. While the "third" window (~1400-1650 nm, and ~1550 nm in particular) is the primary focus of telecommunications applications, first window systems are still implemented. These systems are primarily for local area networking as this wavelength is compatible with low cost gallium arsenide transmitters and silicon receivers. An efficient amplifier in this band would be useful in this application and in broadcast applications. Also, an efficient fiber laser in this region could potentially be used as a replacement for titanium sapphire laser in some applications. It is noted that high efficiency, high power upconversion gain and lasing on this transition has previously been demonstrated in a fluorozirconate host. As is the case for the $^3H_4 \rightarrow ^3F_4$ transition, the upper state is nonradiatively quenched in traditional silicate and alumino-silicate hosts, so that modified hosts are required for efficient operation. This transition originates from the same upper level as the ~1480 nm transition which is the primary subject of this invention. Thus, most of the above teachings pertaining to pumping schemes are directly applicable. However, two points are significantly different for optimizing this transition: 1) it is advantageous to deplete the ground state population as much as possible; and 2) there is no particular advantage to depleting the population in the $^3F_4$ state, other than to increase the population in the $^3H_4$ state. The most promising pump schemes are: 1) ground state absorption to any of the three levels, $^3F_2$, $^3F_3$, or $^3H_4$, at wavelengths of ~635 nm, ~690 nm, and 785 nm, respectively, or 2) two-step absorption, with the second step terminating on the $^3F_2$, $^3F_3$, or $^3H_4$ levels. Applicants have demonstrated lasing on this transition, as shown in FIG. 8, using the same germano-silicate fiber and 1064 nm pumping scheme used for the proof-of-concept demonstration of the 1500 nm transition. As illustrated in FIG. 8, the fluorescence is broad (>20 nm), which is advantageous for applications as an amplifier.

Figure 9:
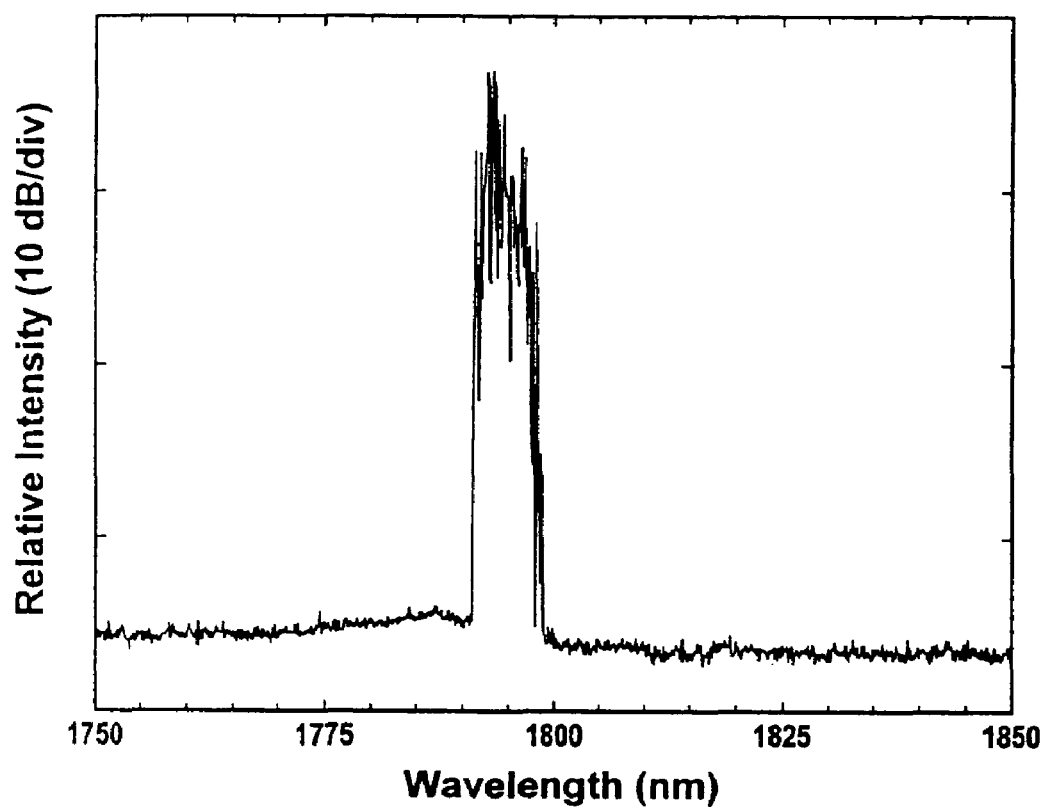
FIG. 9 is a graph illustrating a spectrum of lasing at approximately 1800 nm on the $^3H_4 \rightarrow {^3F_4}$ transition using the configuration of FIG. 5.

Gain and lasing at ~1800 nm on the $^3F_4 \rightarrow {}^3H_6$ transition. Gain and lasing on this transition are well known in silicate-based hosts. Applicants have demonstrated lasing on this transition in the germano-silicate host medium discussed previously, often with simultaneous co-lasing on the 1500 nm transition; an exemplary lasing spectrum is illustrated in FIG. 9. The extensively modified silicate host glasses which are the subject of this patent enable further improvements for amplifiers and lasers based on this transition, as nonradiative quenching will be reduced compared to traditional alumino-silicate and germano-silicate hosts. Pumping of amplifiers and lasers based on this transition can be performed on any of the ground-state absorption lines discussed previously. Of particular interest is the "two-for-one" process which can be effected by pumping on the $^3H_6 \rightarrow {}^3H_4$ transition (~785 nm). This process involves absorption of a single photon by a $Tm^{3+}$ ion, followed by cross-relaxation with a near-neighbor in the ground state to yield two ions in the $^3F_4$ state. This is especially useful for laser applications as it can potentially yield conversion efficiencies (pump-to-signal) of >85%. The process requires a) high doping to enable the necessary cross-relaxation, and b) minimal multiphonon-relaxation quenching of the $^3H_4$ level. The new host material(s) are thus an improvement over previously demonstrated hosts for this application.

Figure 10:
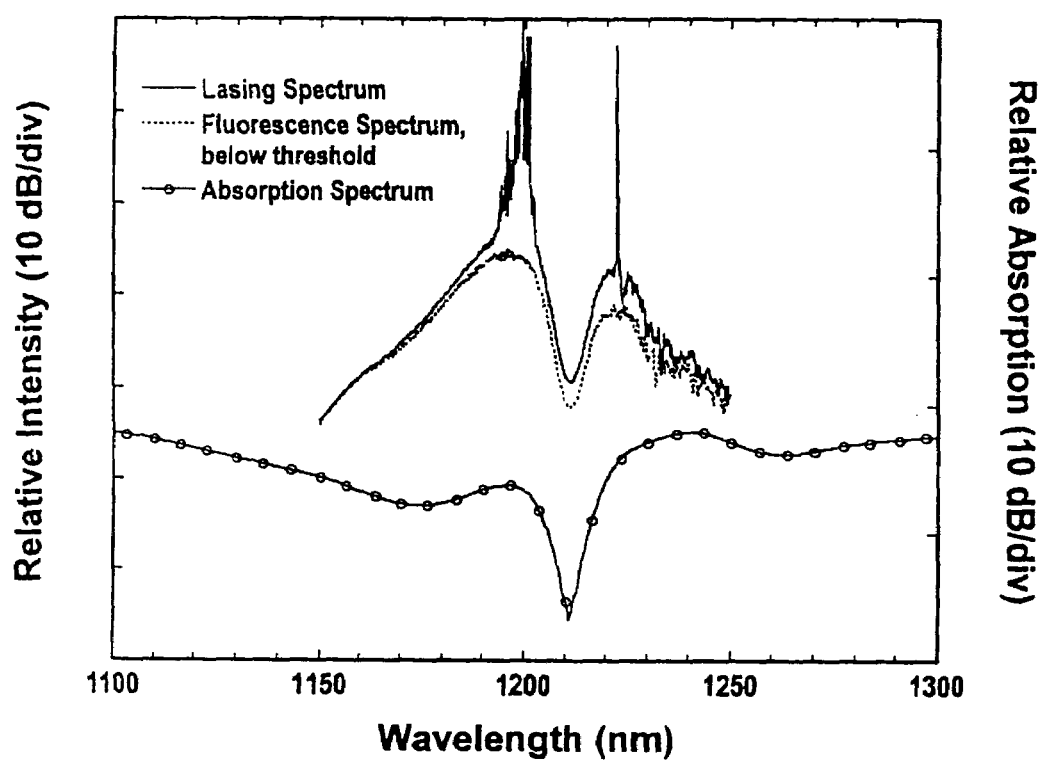
FIG. 10 is a spectra relevant to operation of an amplifier and laser at approximately 1200 nm based on thulium, wherein the top trace (solid line) demonstrates lasing on the $^1G_4 \rightarrow {^3F_6}$ transition in $Tm^{3+}$ doped germano-silicate optical fiber, under three-step absorption pumping at 1064 nm, the middle trace (dashed trace) illustrates fluorescence spectrum for this transition below the lasing threshold, wherein the central dip in both traces is due to ground state absorption on the $^3H_6 \rightarrow {^3H_5}$ transition, which is illustrated in the bottom trace for a 1.0 m fiber.

Gain and lasing at ~1200 nm on the $^1G_4 \rightarrow {}^3H_4$ transition. The inventors have demonstrated lasing on this transition also using the same host and pumping scheme as for the transitions described above. This is the first demonstration of gain and lasing on this transition. The wavelength is. outside any currently used telecommunications band, although it is potentially useful for telecommunications as the loss of silica fiber is acceptably low (~0.5 dB/km or less.) This wavelength has historically been little used. There are likely to be serious problems with the performance of an amplifier based on this transition, due to the near-perfect coincidence with the ground state absorption line on the $^3H_6 \rightarrow {}^3H_5$ transition. FIG. 10 illustrates the absorption on the ground state absorption line, the fluorescence spectrum below threshold for this transition, and lasing on this transition, showing operation to either side of the peak ground state absorption. Considering the strong GSA, optimization of this transition would require strong pumping to both deplete the ground state and promote a large fraction of the population to an intermediate level. The logical choice for such a population reservoir is the $^3F_4$ level, as it has the longest lifetime; it is possible that the $^3H_4$ could alternatively be used if the nonradiative decay rate of this level can be made negligible, though this conflicts with the objective of minimizing the population in this level to maximize the inversion. Presuming $^3F_4$ as the reservoir level, pumping to the $^1G_4$ level can be effected by a single absorption at ~650 nm. Alternatively, a two-step absorption process involving $^3F_4 \rightarrow {}^3H_4/{}^3F_3/{}^3F_2$ (~1450/1120/980 nm) followed by $^3H_4 \rightarrow {}^1G_4$ at 1150 nm could be used. The initial promotion out of the ground state can be effected by pumping on any of the ground state absorption lines; pumping on the $^3H_6 \rightarrow {}^3H_5$ transition (~1150 nm) allows a single pump wavelength to be used. The reduced-phonon-energy hosts which are the basis for the primary subject invention would particularly facilitate the latter pumping scheme. Likewise, the host would minimize any nonradiative quenching of the $^1G_4$ upper state.

Figure 11:
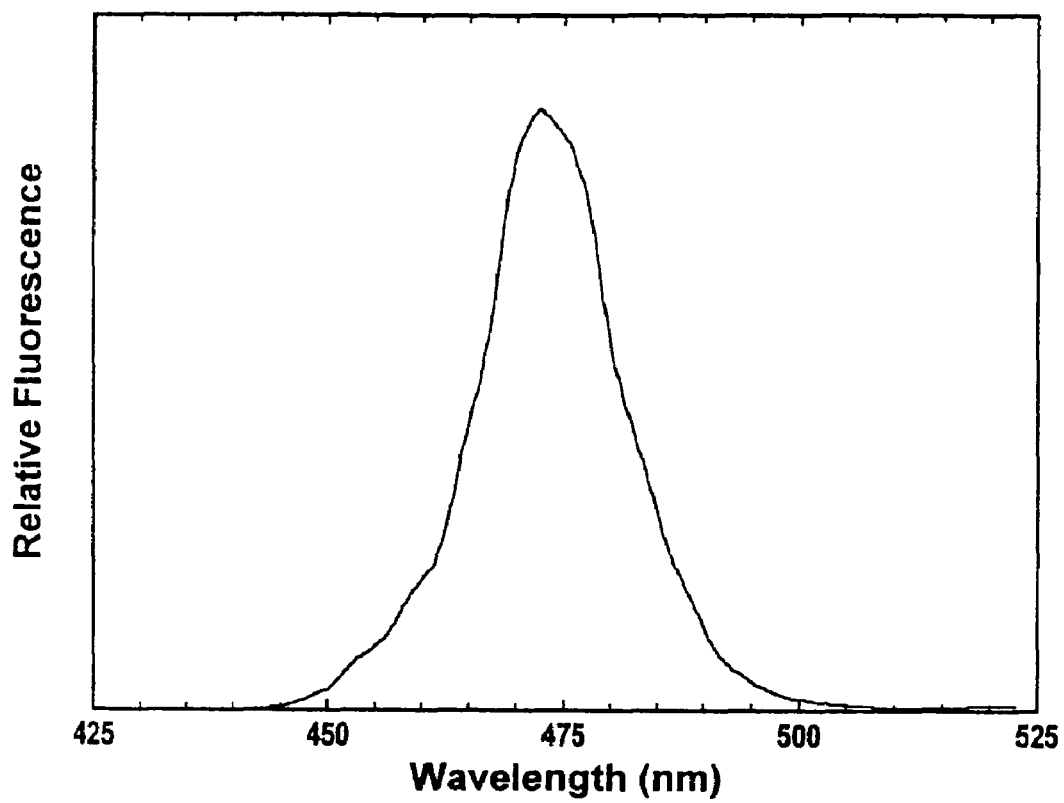
FIG. 11 is a fluorescence spectrum for $^1G_4 \rightarrow {^3H_6}$ transition in a thulium doped germano-silicate optical fiber under a three-step absorption pumping at 1064 nm.

Gain and lasing at ~480 nm on the $^1G_4 \rightarrow {}^3H_6$ transition. Blue lasing based on this transition has previously been demonstrated in fluorozirconate fiber using a three-step absorption pumping scheme. There are a wide variety of applications for an efficient, moderate power (0.1-1 W) laser, particularly in printing and data storage. The many problems associated with fluorozirconate fiber have prohibited commercialization of the demonstrated device; demonstration of this transition in a silicate-based host would eliminate the majority of those problems. Fluorescence is observed under 1064 nm pumping in the germano-silicate used in applicants experiments, as illustrated in FIG. 11. Considerations for pumping are essentially similar to those for pumping the $^1G_4 \rightarrow {}^3H_4$ amplifier and laser.

The chief advantages of the present invention stem from the implementation of the amplifier and laser in a fiber host glass which is derivative of standard silica based optical fibers. Specific advantages and new features include:

1. Operation in the low-loss window of standard silica telecommunications fiber. In particular, it operates in the band ~1420-1530, directly on the blue side of the well developed erbium doped optical fiber amplifier, which is used for amplification at 1525-1570 nm (typically). Operation in this wavelength band is specifically enabled by the development of phonon-engineered, modified silicate host glasses, as described above.

2. The gain fiber can be fabricated by means which are a direct extension of the standard techniques used for manufacture of silica telecommunications fiber and doped alumino-silicate rare-earth doped amplifier fibers, which techniques have been extensively developed over the past two decades.

3. The amplifier fiber is mechanically compatible with standard silica telecommunications fiber. Unlike fluorozirconate, chalcogenide and other low-phonon energy glasses, the alumino-germano-silicate fibers specified above are mechanically compatible with standard silica telecommunications fiber. In particular, they can be directly fusion spliced to silica fiber using standard techniques, to obtain a low loss, high strength coupling from the gain fiber to the rest of the telecommunications system. This is in marked contrast with fluorozirconate, chalcogenide, or tellurite glasses, which cannot be fusion spliced to silica fiber because of low melting points and dissimilar thermal expansion coefficients.

4. The amplifier is optically compatible with standard silica telecommunications fiber. The index of refraction of the germanium and/or gallium-rich compositions described above is only slightly higher than for pure silica (~1.50 vs. 1.45). This allows for very high return loss splices between the gain fiber and silica fibers, which is important in many telecommunications systems. Furthermore, the capability to fusion splice the fiber to standard fibers allows some diffusion of the dopants from one fiber into the other, also improving both the return loss and the insertion loss of the splice. By comparison, the alternative chalcogenide and tellurite glasses have very high refractive indices which inevitably yield poor return loss and/or insertion loss when spliced (mechanically) to silica fiber.

A specific example directed to an S-band amplifier will now be described in greater detail. This specific example is not intended to limit the scope of the invention described and claimed herein.

EXAMPLE 2

As described above, the ever-expanding demand for bandwidth in wavelength division multiplexing systems over the past few years has led to the extensive development of optical fiber amplifiers in the C-band (1530-1565 nm) and L-band (1570-1610 nm) based on erbium-doped silicate glasses. However, these two bands account for <25% of the usable low-loss fiber telecommunications window (approximately 1400-1700 nm). Thus, development of a practical amplifier within this window is of substantial interest, particularly in the so-called S-band, ~1450-1520 nm.

The thulium $^3H_4 \rightarrow {}^3F_4$ transition can provide amplification in the S-band wavelength range was first demonstrated by Komuka et al. using a fluorozirconate host. See, T. Komuka et al., "1.47 μm band $Tm^{3+}$ doped fluoride fibre amplifier using a 1.064 μm upconversion pumping scheme", *Electron Lett.* 29, 10-112 (1993). Despite considerable subsequent development, application of Tm:ZBLAN amplifiers is limited by difficulties with fabrication and robustness of the host material. Particularly, the fluorozirconate glasses are hygroscopic and prone to formation of micro-crystallites over time. Furthermore, the glass transition temperature for these glasses is relatively low (~400° C.) compared to silica (~1100° C.), so that fusion splicing to standard telecommunications-grade fiber is impossible. This necessitates the use of butt splices that are comparatively lossy and prone to damage under high power pumping. These limitations have spurred the development of alternative host materials. Most recently, gain of >20 dB was reported for a multi-component glass host; note, however, that the reported host glass requires specialized fabrication techniques (e.g., drawing by a triple-crucible method), and likewise cannot be spliced to standard silica fibers. See, B. N. Samson et al., "Thulium-doped Silicate Fiber Amplifier at 1460-1520 nm", *Optical Amplifiers and Their Applications*, OSA Technical Digest (Optical Society of America, Washington, D.C. 2000), pp. PD6-1.

The relevant design parameters for the gain fiber are listed in Table I. The lifetime of the $^3H_4$ level was measured from the preform to be 55 μs; this is sufficiently improved compared to pure silica (<20 μs) to enable gain, though well below the expected radiative lifetime of ~1 ms.

TABLE I

| Thulium doped fiber parameters | |
|---|---|
| Core Diameter | 3.4 μm |
| Numerical Aperture | 0.35 |
| Lifetime, $^3H_4$ level | 55 μs |
| Tm Doping Concentration, nominal | 0.5% (mole fraction) |

As discussed above, several pump schemes may be implemented to obtain inversion on the $^3H_4 \rightarrow {}^3F_4$ transition. As the lifetime of the terminal level is substantially longer than that of the upper level, it is especially important to pump at a wavelength with strong excited state absorption to remove population from $^3H_4$. Past research has focused on pumping in the $^3F_4 \rightarrow {}^3F_{2,3}$ ESA band, ~1020-1200 nm, which conveniently is also absorbed on the $^3H_6 \rightarrow {}^3H_5$ transition. Recently, in-band pumping on the short-wavelength tail of the gain transition, at ~1400-1430 nm, has also been proposed and demonstrated, with co-pumping at ~1560 nm to promote usable population from the ground state. See, B. N. Samson et al. cited above, and T. Kasamatsu et al. "Laser Diode Pumping (1.4 and 1.56 μm) of Gain-shifted Thulium Doped Fibre Amplifier", *Electron Lett.*, 36, 1607-1609 (2000). Note that it is advantageous to avoid inversion on $^3H_4 \rightarrow {}^3H_6$, as this higher branching ratio transition may operate with high gain, competing with the transition of interest. See, M. L. Dennis et al., "High Power Upconversion Lasting at 810 nm in TM:ZBLAN Fibre", *Electron Lett.* 30, 136-137 (1994). Both schemes have been investigated, both separately and in combination: The inventors have used up to 750 mW at 1047 nm from a diode-pumped Nd:YLF laser, and up to 1100 mW at 1410 nm generated from a Raman fiber laser pumped by a 1320 nm Nd:YAG laser.

Figure 12:
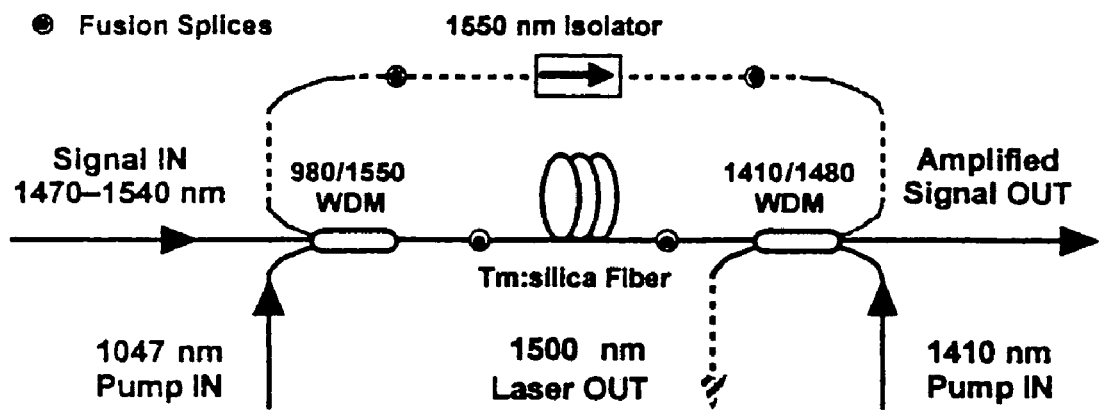
FIG. 12 is an experimental arrangement utilized to make gain measurements, wherein modifications for laser operation are shown with hatched lines.

FIG. 12 1 illustrates the experimental test setup. All fiber components, including the gain fiber, are fusion spliced. A −3 dBm signal from an external cavity diode laser, tunable over 1470-1540 nm, is injected into the amplifier and the output power is recorded as a function of wavelength using an optical spectrum analyzer. To determine the internal gain of the amplifier, this is compared with transmission through the setup with the gain fiber removed. The inventors have performed measurements both at room temperature and at liquid nitrogen temperatures to help elucidate the performance improvement to be obtained with increased excited state lifetimes.

Figure 13:
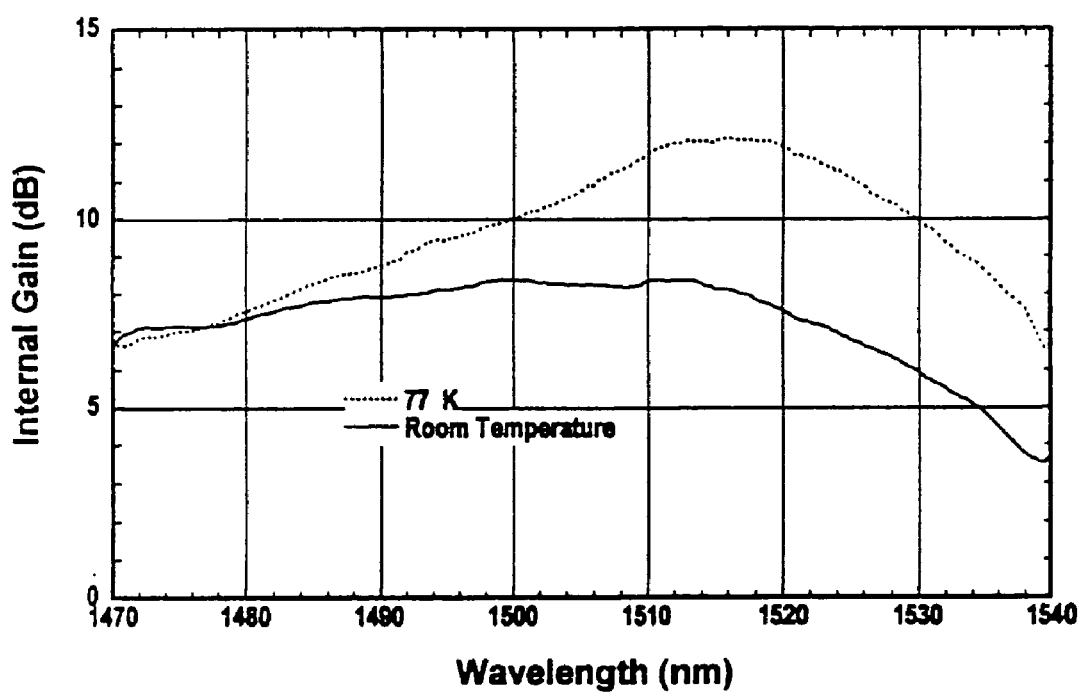
FIG. 13 is measured gain as a function of wavelength for the configuration shown in FIG. 12.

FIG. 13 plots the measured gain for co-pumping with both sources with 3.7 m of gain fiber. Up to 8 dB small signal gain is obtained at room temperature, and this is essentially flat over the band 1470-1520 nm. Small-signal gain up to 12 dB is obtained at cryogenic temperatures. (Note, however, that the temperature at the doped fiber core is expected to be well above 77 K, due to the high nonradiative decay rate from the $^3H_4$ level. Likewise, "room temperature" gain correspond to elevated temperature at the fiber core.) The gain under co-pumping is significantly improved compared to pumping with either wavelength separately: At room temperature, maximum gains of 3 dB for 1410 nm pumping only, and 0.5 dB with 1047 nm pumping only, are obtained. The effect of co-pumping at 1555.5 nm (up to 400 mW), with either or both of the other wavelengths was also investigated. Contrary to the results reported by B. N. Samson et al. and T. Kasamatsu et al., no significant improvement in the peak gain was observed; rather, gain is enhanced by <2 dB for wavelengths >1530 nm, but suppressed by up to 5 dB for wavelengths <1500 nm.

Conversion efficiency was further investigated by connecting the amplifier output to the input through an optical isolator to construct a simple unidirectional ring cavity. For an output coupling of 0.7 dB (15%), obtained output powers given in Table II (for room temperature operation.) The operating wavelength is 1500 nm. Pump-to-signal conversion is fairly high, at 12.5%, with a slope efficiency with respect to 1047 nm pumping of up to 28%. Excess loss between the gain fiber and the output coupler (i.e., the isolator and splices) is estimated as ~0.7 dB, so that the actual internal pump conversion and efficiency are up to twice these measured values. The output power and efficiency improves only marginally for cryogenic operation.

TABLE II

Thulium Fiber Laser Output

| 1047 nm Pump Power | 1410 nm Pump Power | 1500 nm Output Power |
|---|---|---|
| 750 mW | 0 mW | 16 mW |
| 0 | 1050 | 106 |
| 600 | 1050 | 170 |
| 750 | 1050 | 225 |

The results demonstrate the first thulium doped amplifier based on a standard silicate host fiber. The gain fiber is fusion spliceable to standard telecommunications fibers. Useful small signal gain over a broad bandwidth is obtained, with efficient power conversion as a power amplifier as demonstrated by laser operation. In-band pumping at 1410 nm is found to be critical to operation, both as an amplifier and laser. Furthermore, high power pumping is required to overcome the high nonradiative decay rate from the $^3H_4$ level. Some improvement for cryogenic operation is demonstrated, indicating that modifications to the composition to increase the lifetime of the $^3H_4$ level may lead to development of a practical TDFA.

Modifications and variations of the present invention are possible in light of the above teachings. It is therefore to be understood that, within the scope of the appended claims, the invention may be practiced otherwise than as specifically described.

What claimed is:

1. A laser comprising:
   a closed loop fiber wherein the closed loop fiber includes an optical gain fiber;
   means for introducing a pump light into the closed loop fiber; and
   means for providing an output from the closed loop fiber;
   wherein the optical gain fiber comprises a modified silica glass configured to provide a reduction in the multiphonon quenching for a rare-earth dopant;
   wherein said modified silica glass comprises $SiO_2$ in a host material, a rare-earth oxide dopant selected from the group consisting of $Tm^{3+}$, $Ho^{3+}$ and $Tm^{3+}$ sensitized —$Ho^{3+}$, and a first $SiO_2$ modifier; and
   wherein said first modifier is a 3+ cation dopant and is selected from the group consisting of Ga, Y, and combinations thereof, configured such that said first modifier reduces multiphonon quenching of said rare-earth dopant contained therein.

2. A laser as claimed in claim 1, wherein the modified silica glass further
   comprises:
   a second $SiO_2$ modifier; and
   wherein said second modifier concentration is between about 0.1 and about 10 molar percent of said second modifier in said host material such that said first modifier and said second modifier reduce multiphonon quenching of said rare-earth dopant contained therein.

3. A laser as claimed in claim 1:
   wherein said concentration of $SiO_2$ is between about 70 and about 99 molar percent $SiO_2$ in said host material;
   wherein said rare-earth concentration is between about 100 and about 100,000 ppm by weight of said rare-earth oxide in said host material; and
   wherein said first modifier concentration is between about 0.1 and about 20 molar percent of a first modifier in said host material.

4. A laser as claimed in claim 2, wherein said second modifier is a 5+ cation dopant.

5. A laser as claimed in claim 2, wherein said second modifier is selected from the group consisting of $Ta^{5+}$, $Bi^{5+}$ and combinations thereof.

6. A laser as claimed in claim 1, wherein the means for introducing a pump light comprises a first fused-tapered fiber wavelength division multiplexing coupler.

7. A laser as claimed in claim 6, wherein the means for providing an output from the closed loop fiber comprises a second fused-tapered fiber wavelength division multiplexing coupled that taps an output lasing signal out of the closed loop fiber.

8. A laser as claimed in claim 1, wherein the laser operates on the $^3H_4 \rightarrow ^3F_4$ transition.

9. A laser as claimed in claim 1, wherein the laser operates on the $^3H_4 \rightarrow ^3H_6$ transition.

10. A laser as claimed in claim 1, wherein the laser operates on the $^1G_4 \rightarrow ^3F_2$ transition.

11. A laser as claimed in claim 1, wherein the laser operates on the $^3F_4 \rightarrow ^3H_6$ transition.

12. A device comprising:
    a thulium doped silica based optical fiber, wherein said optical fiber comprises $SiO_2$ in a host material, a $Tm^{3+}$ dopant and a first $SiO_2$ modifier, wherein said first modifier is a 3+ cation dopant and is selected from the group consisting of Ga, Y, and combinations thereof, configured such that said first modifier reduces multiphonon quenching of said $Tm^{3+}$ contained therein;
    means for introducing a pump light into the fiber; and
    means for providing an output from the fiber;
    wherein the device is configured to operate on the $^3H_4 \rightarrow ^3F_4$ transition.

13. The device of claim 12 further comprising: wherein the optical fiber further comprises a second SiO2 modifier; wherein said second modifier concentration is between about 0.1 and about 10 molar percent of said second modifier in said host material such that said first modifier and said second modifier reduce nmltiphonon quenching of said $Tm^{3+}$ dopant contained therein.

* * * * *